United States Patent [19]

Loos et al.

[11] Patent Number: 4,941,502
[45] Date of Patent: Jul. 17, 1990

[54] LOW PRESSURE RECIRCULATION VALVE

[75] Inventors: George Loos, North Wales; Horace J. Maxwell, Langhorne, both of Pa.

[73] Assignee: Keystone International Holdings Corp., Wilmington, Del.

[21] Appl. No.: 359,134

[22] Filed: May 31, 1989

[51] Int. Cl.$^5$ .............................................. F04D 15/00
[52] U.S. Cl. .................................. 137/116; 137/117; 137/569
[58] Field of Search ................. 137/117, 115, 116, 569

[56] References Cited

U.S. PATENT DOCUMENTS

| | | |
|---|---|---|
| 934,360 | 9/1909 | Roth . |
| 1,537,943 | 5/1925 | Hufford . |
| 2,398,089 | 4/1946 | Fehr . |
| 2,702,048 | 2/1955 | Coffey . |
| 2,879,794 | 3/1959 | Costello . |
| 3,750,693 | 8/1973 | Hardison . |
| 3,825,221 | 7/1974 | Smith, Jr. . |
| 4,095,611 | 6/1978 | Hetz . |
| 4,207,915 | 6/1980 | Beker .................... 137/117 |
| 4,243,064 | 1/1981 | Nolte . |
| 4,501,290 | 2/1985 | Sturman et al. . |
| 4,516,600 | 5/1985 | Sturman et al. . |
| 4,541,454 | 9/1985 | Sturman et al. . |
| 4,638,831 | 1/1987 | Lindgren ................. 137/117 |

OTHER PUBLICATIONS

ARC automatic recirculation control valve, Yarway Corporation, 1980.

Primary Examiner—Alan Cohan
Attorney, Agent, or Firm—Ferrill and Logan

[57] ABSTRACT

A low pressure recirculation valve for cooling a centrifugal pump. The invention comprises a unitary valve casing divided into a first valve chamber and a second valve chamber, the casing having a first port for introducing fluids into said first chamber, and a second port for expelling fluids out of said second chamber, the first chamber having a recirculation port for redirecting fluids back to said centrifugal pump. A multiple piece check valve member situated between said first chamber and second chambers permits the flow of fluid from said first chamber to the second chamber and prevents the flow of fluid from said second chamber to said first chamber. A slidable valve stem coupled to said check valve member and extending through the first chamber moves the check valve member from an open to closed position. Means coupled to said valve stem biases the slidable valve stem and check valve means toward the closed position. A recirculation valve means operatively coupled to said valve stem opens and closes said recirculation port, said recirculation valve means opening when said check valve means is closed and closing when said check valve means is open.

11 Claims, 4 Drawing Sheets

LOW PRESSURE RECIRCULATION VALVE

FIELD OF THE INVENTION

The present invention is directed to a low pressure recirculation valve for recirculating fluid back to a centrifugal pump in order to cool the pump during intervals when there is a minimum demand for the pumped fluid downstream of the valve. More particularly, the present invention is directed to a recirculation valve having a multiple piece check valve disk which can provide a larger effective disc allowing the use of a higher spring rate and providing greater stability to the valve. The two piece disc also allows the use of a one piece body with a large disc providing a more economical design.

BACKGROUND OF THE INVENTION

Centrifugal pumps are used in a variety of applications. It is often desirable to recirculate fluid back to a centrifugal pump during intervals of low demand by an outlet device to prevent the pump from overheating. Overheating is caused by the exchange of heat between the running pump and stationary fluid present within the pump. Pump overheating lowers the vapor pressure resulting in fluid cavatation which can destroy the pump housing and impeller.

Recirculation valves are frequently used in centrifugal pumps to control overheating. One commonly used recirculation valve is a modulating flow control valve disclosed in U.S. Pat. No. 4,095,611. The valve disclosed in U.S. Pat. No. 4,095,611 has a circular disk-shaped check valve member interposed within a two-piece valve casing. During periods of normal downstream fluid demand, a pressure differential across the valve causes it to open and permit flow, while simultaneously blocking a fluid recirculation passageway. Conversely, during intervals of minimal downstream fluid demand, the disk-shaped check valve member returns to a closed position, thereby opening the fluid recirculation passageway and permitting fluid to recirculate back to the pump.

Another recirculation valve, disclosed in U.S. Pat. No. 4,243,064, has a circular main valve disk and bypass valve disk axially displaced among both ends of a connecting rod. During periods of normal fluid flow, the connecting rod moves to an open position causing fluid to flow out both the main outlet and the bypass outlet. When fluid flow is minimal, the bypass valve disk is superimposed over an annular seat which causes fluid to be redirected from the main outlet to the bypass outlet and recirculated through the centrifugal pump.

A problem encountered with the use of such recirculation valves is that they have complex structures, and are both costly to manufacture and difficult to maintain. Most of the recirculation valves presently available on the market, including the two described above, are constructed from two piece valve casings. A multiple piece casing is required because the valve members are too large to fit through the casing.

It is an object of the present invention to provide a recirculation valve having a one-piece valve casing and a multiple piece check valve member which can fit through and be assembled with the one piece casing and which regulates the flow of fluid from a centrifugal pump to a downstream device.

It is a further object of the present invention to provide a recirculation valve having a multiple piece valve member which can be easily inserted into and removed from a unitary valve housing.

It is an additional object of the present invention to provide a recirculation valve mechanism having a novel recirculation valve mechanism operated in association with the valve member so as to control the recirculation of fluid back to the centrifugal pump.

SUMMARY OF THE INVENTION

In accordance with the present invention a low pressure recirculation valve for cooling a centrifugal pump is disclosed. The invention comprises a unitary valve casing divided into first and second chambers. The casing has a first port for introducing fluids from a centrifugal pump into the first chamber and a second port for expelling fluids out of the casing through said second chamber. The first chamber further has a recirculation port for redirecting fluid from the first chamber to the pump. A multiple piece check valve member is situated between said first and second chambers. The check valve opens to permit flow from first chamber to said second chamber and closes to impede fluid flow from said second chamber to said first. A spring biases the check valve towards a closed position. Finally, a recirculation valve coupled to the check valve means opens the recirculation port when the check valve means is closed and closes the recirculation means when the check valve is open.

BRIEF DESCRIPTION OF THE DRAWINGS

The foregoing summary, as well as the following detailed description will be better understood when read in conjunction with the figures appended hereto. For the purpose of illustrating the invention, there is shown in the drawings an embodiment which is presently preferred, it being understood, however, that this invention is not limited to the precise arrangement and instrumentalities shown.

DESCRIPTION OF A PREFERRED EMBODIMENT

Figures 1, 2:
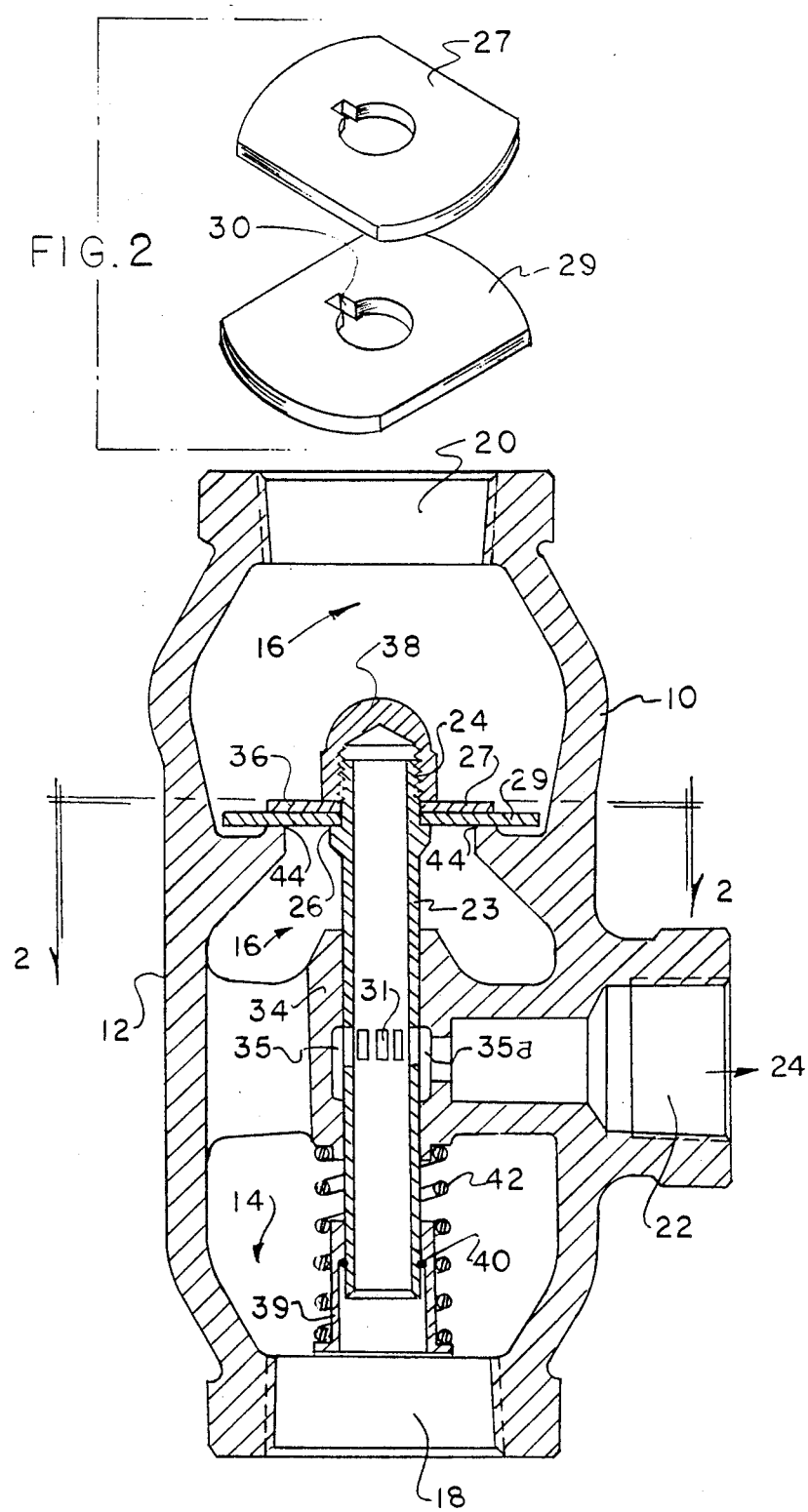
FIG. 1 is an elevated section view of one embodiment of a recirculation valve according to the present invention.
FIG. 2 is an exploded view of the multiple pieced valve member of the preferred embodiment.

Referring to the drawings, there is shown in FIG. 1 an elevated cross-section view of a low pressure recirculation valve 10 in accordance with the present invention. The recirculation valve 10 of the present invention is preferably constructed from a corrosion-resistant material such as stainless steel, and comprises a unitary generally cylindrical valve casing 12. Valve casing 12 is divided into chambers 14 and 16. Chamber 14 has an inlet port 18 which is connected to a centrifugal pump located upstream of the valve. Chamber 16 is located downstream of chamber 14 and is connected to a downstream fluid outlet device to receive the pumped fluid via an outlet port 20. A recirculation port 22, located on the side of the casing within chamber 14 is connected to a recirculation conduit or passageway 24 which redirects the fluid back to a receiving vessel or storage tank which supplies the inlet to the pump.

Located within the casing of the chamber 14 is a hollow, generally cylindrical valve stem 23. Valve stem 23 has a threaded top end 24, and is interposed within the first chamber of the valve casing 12 along a longitudinal central axis of the valve casing 12. The upper walls 26 of the valve stem 23 as seen in FIG. 1 form a ledge at a top portion of the valve stem 23 directly below threaded top end 24. A plurality of apertures 31 are provided in the valve stem 23. The apertures 31 define a recirculation valve between chamber 14 and the recirculation port 22 and allow fluid to be recirculated back to the centrifugal pump during intervals of low downstream flow demand. Additionally, these apertures (31) provide a specific fluid restriction which reduces the pressure energy of the fluid so that recirculation flow may be discharged into a lower pressure receiving vessel which is connected to the inlet of the pump.

The recirculation valve 10 has a valve stem guide 34 which is integral to valve casing 12 within first chamber 14 and guides the valve stem 23 during its longitudinal movement along the central axis or valve casing 12. The valve stem guide 34 has a channel defined by slots 35, 35a located in the walls of the guide. When the valve stem 23 is in a closed position, the plurality of apertures 31 are aligned with the slots 35, 35a and apertures 31 serve a passageway through which fluid exits the recirculation port 22 from chamber 14.

The multiple check valve member 36 is now described with reference to the exploded view of FIG. 2. The multiple piece check valve member 36 is axially placed over the threaded top end 24 of valve stem 23 and rests on the top portion of the stem. Valve member 36 acts as a pressure actuated check valve for the fluid flow system. Valve member comprises an apertured first disk segment 27 superimposed at a 90 degree angle over an apertured second disk 29. The disks are keyed 30 so that they remain locked when secured to the valve stem. Both disks are rectangular on one set of opposing sides and curvilinear on another set of opposing sides. When superimposed, the keyed superimposed disks form a circular valve member and obviate the need for a multiple piece housing. The non-circular shape of the disks permit them to fit individually through outlet port 20. A retaining nut 38 is screwed onto the threaded top end 28 of the valve stem 23. The nut 38 secures the multiple piece valve member 36 to the valve stem.

Valve stem 23 further includes a base member 39 connected at a bottom end of the valve stem 23. Base member 39, as shown, is a cylindrical flange which is radially disposed relative to valve stem 23. The base member 39 is retained in position by an attachment pin 40 which is inserted through the valve stem. The valve stem 23 further incorporates a coiled biasing spring 42 connected to the bottom end of the valve stem 23 between the valve stem guide 34 and base member 39. Coil spring 42 provides spring-loaded activation of the valve stem 23 between a fully open and closed position and biases valve stem 23 and multiple piece check valve member 36 toward the inlet port and the closed portion.

The valve casing 10 further includes a lip 44, situated between the first and second chambers. Lip 44 extends from the walls of the valve casing 12 and defines a seal on which the multiple piece check valve member 24 rests in the closed position. The lip divides the valve chambers 14 and 16 and enables valve member 36 to operate as a check valve for the fluid flow system by preventing fluid from flowing back into the chamber 14.

Figure 3:
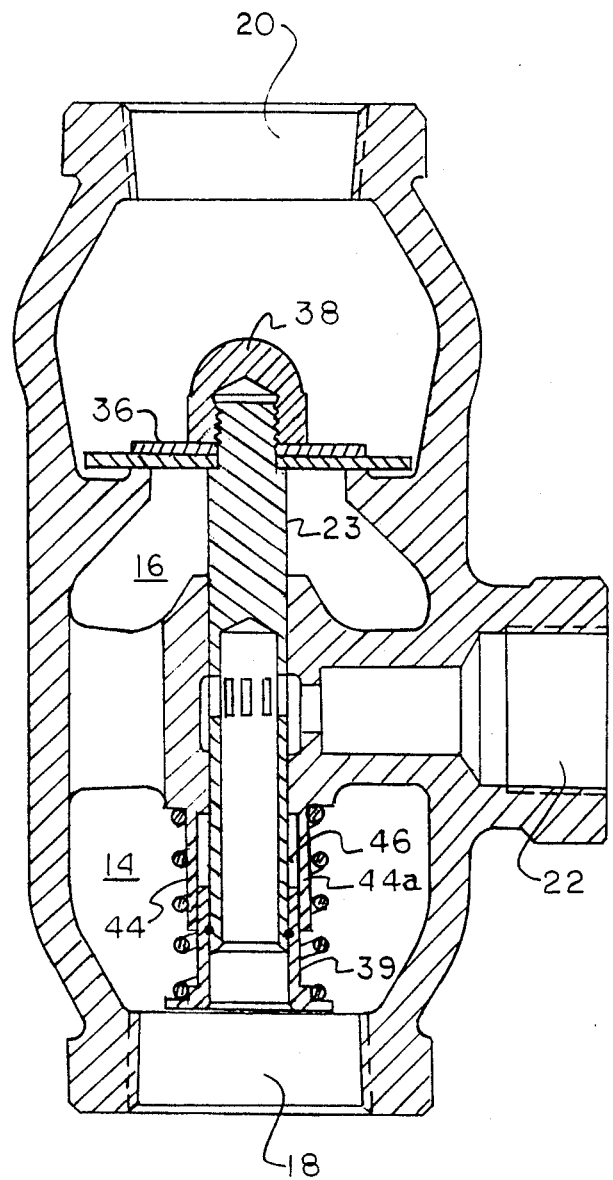
FIG. 3 is an elevated section view of a recirculation valve having a solid stem member.

Referring to FIG. 3, an alternative embodiment of the recirculation valve 10 in accordance with the present invention is shown. In this embodiment, stem 23 is solid. In addition, the stem guide 34 has extensions 44, 44a which extend past base member 39 and which create a close fit with base member 39 thereby creating a piston chamber 46. Member 39 pushes trapped fluid out of chamber 46 as the stem 23 moves up when the valve opens and draws fluid into chamber 46 when the valve closes. The restricted flow in and out of chamber 46 serves to dampen any tendency of the valve stem to oscillate.

Figure 4:
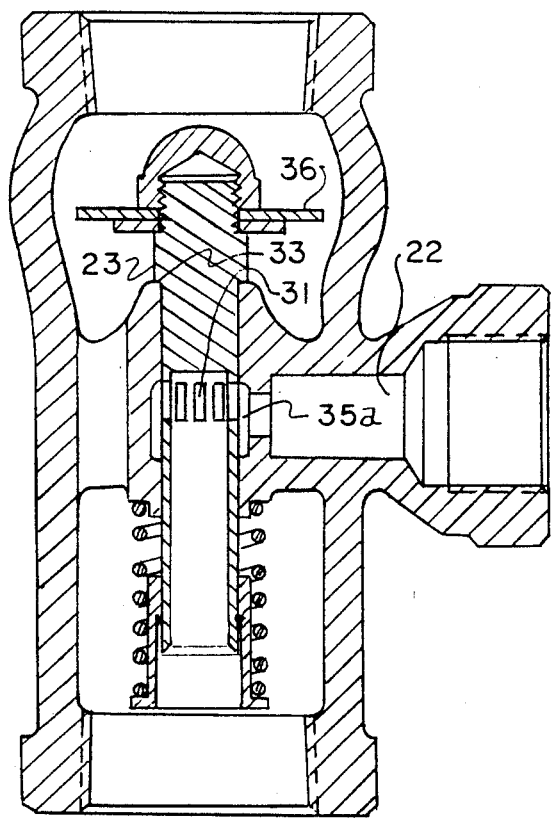
FIG. 4 is an elevated section view of the recirculation valve of FIG. 3 without a lip and having straight side walls along a lower portion of the valve casing.

An alternative embodiment is shown in FIG. 4. In this embodiment, the valve 10 solely performs a recirculating function. Lip 44 shown in FIG. 1 is not present in this embodiment and valve member 36 does not operate as a check valve. The valve stem in this embodiment is retained in an initial position by shoulder 33 which mates with the valve stem guide. Upon demand downstream of the valve a pressure differential is formed on the sides of the multiple piece valve member 36 forcing the valve stem 23 and valve member 36 in an upward direction. This closes off the passageway defined by slots 35, 35a and apertures 31. When demand from the downstream outlet device reduces, the biased valve stem 23 and valve member 36 return to an initial position due to the pressure equilibrium on both sides of the valve member 24, thereby realigning slots 35, 35a and apertures 31 and enabling fluid to flow through the recirculation port 22 to be recirculated through the centrifugal pump.

OPERATION

Figure 5:
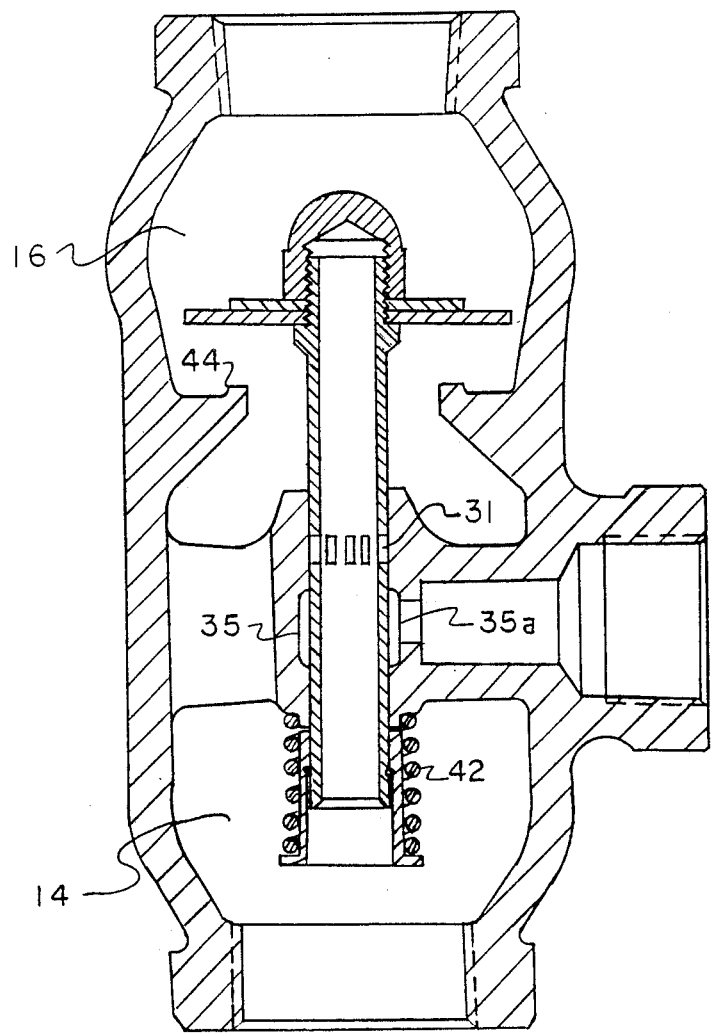
FIG. 5 is an elevated section view of the embodiment of FIG. 1 in which the valve member is open and the recirculation conduit is closed.

The operation of the present invention is now described with reference to the enclosed figures and most particularly FIGS. 1 and 5. The recirculation valve of the present invention is a combination multiple piece main check valve and recirculation valve for use in fluid flow systems which utilize a centrifugal pump. The recirculation valve redirects fluid back into the centrifugal pump to prevent it from overheating during intervals of minimum downstream flow.

Fluid emerging from the centrifugal pump enters the recirculation valve 10 through the inlet port causing the first chamber 14 to fill with fluid. During intervals of low downstream demand, the fluid pressure in chamber 16 approaches that of the chamber 14. Valve member 36 and valve stem 23 are retained in a closed position by spring 42 and fluid emitted from the pump is redirected through the recirculation port 22 via slots 34, 35a and apertures 31.

Upon demand downstream by an outlet device, a pressure differential is formed on both sides of the multiple piece valve member 36 wherein the fluid pressure in the first chamber 14 drops below that of the second chamber 16. When this pressure differential exceeds the preload from spring 42, valve member 36 and stem 23 to move in a longitudinal direction towards the fully open position. Coil spring 42 compresses until member 39 butts against guide 34. Apertures 31 move away from their aligned position relative to the slots 34, 35a thereby terminating the redirection of fluid flow out of recirculation port 22. The longitudinal movement of the valve stem 23 towards the fully open position causes the multiple piece valve member 36 to dislodge from the seat 21, thereby breaking the seal and allowing to be discharged through the outlet port 20.

When demand by the downstream outlet device reduces, fluid pressure within chamber 16 again builds up. The pressure differential across valve member 36 is reduced. The force created by the differential pressure is less than the force created by spring 42. Coiled biasing spring 42 connected to the bottom end of the valve stem 23 expands and the valve stem returns to its closed position so that the valve member 36 is once again superimposed over lip 44. The valve stem apertures 31 are realigned with the slots 35, 35a in the valve stem guide and fluid flow is again redirected out of the recirculation port 22 to be recirculated back through the centrifugal pump. The multiple-piece check valve means can be easily inserted and attached with the unitary housing.

It will be recognized by those skilled in the art that changes may be made to the above-described embodiment of the invention without departing from the broad inventive concepts thereof. It is understood, therefore, that this invention is not limited to the particular embodiment disclosed, but it is intended to cover all modifications which are within the scope and spirit of the invention as defined by the appended claims.

What is claimed is:

1. A low pressure recirculating valve for cooling a centrifugal pump comprising;
    a unitary valve casing having a first chamber for connection to a centrifugal pumping means and a second chamber for connection to a fluid outlet, said first chamber having a recirculation port for redirecting fluid from said first chamber to said centrifugal pump;
    multiple piece check valve means situated between said first and second chambers for permitting fluid flow from said first chamber to said second chamber, said check valve means comprising a flat disk and a second disk transversely superimposed over said first disk whereby said disks can fit and be assembled within said unitary casing; said check valve means opening when the fluid pressure in said first chamber exceeds the fluid pressure in said second chamber and closing when the fluid pressure in the second chamber approaches that in that said first chamber; and
    recirculation valve means coupled to said valve means for controlling the flow of fluid from said first chamber through said recirculation port, said recirculation valve impeding such flow when said check valve means is open and permitting such flow when said check valve means is closed.

2. The recirculation valve of claim 1 further comprising means for biasing the check valve means toward the closed position.

3. The recirculation valve of claim 1 wherein said check valve means comprises a plurality of matable pieces.

4. The recirculation valve of claim 2 wherein said bias means comprises a coil spring.

5. The recirculation valve of claim 1 wherein said check valve means is retained in position by a fastening means.

6. A low pressure recirculation valve for cooling a centrifugal pump comprising:
    a unitary valve casing divided into first and second chambers, said casing having a first port for introducing fluids from a centrifugal pump into said first chamber and a second port for expelling fluids out of said casing through said second chamber, said first chamber having a recirculation port for redirecting fluids from said first chamber toward said pump;
    a multiple piece check valve member situated between said first and second chambers, said check valve member opening to permit flow from first chamber to said second chamber and closing to impede fluid flow from said second chamber to said first, said check valve means comprising a flat disk and a second disk transversely superimposed over said first disk whereby said disks can fit and be assembled within said unitary casing;
    means for biasing said check valve member towards a closed position;
    recirculation valve means coupled to said check valve member for opening said recirculation port when said check valve member is closed and closing said recirculation means when said check valve member is open.

7. The recirculation valve of claim 6 wherein said check valve member and said recirculation valve are coupled by a valve stem extending through said first chamber.

8. A low pressure recirculation valve for cooling a centrifugal pump comprising;
    a unitary valve casing divided into a first valve chamber and a second valve chamber, said casing having a first port for introducing fluids into said first chamber, a second port for expelling fluids out of said second chamber, said first chamber having a recirculation port for redirecting fluids back to said centrifugal pump;
    a multiple-piece check valve member situated between said first chamber and second chambers for permitting the flow of fluid from said first chamber to said second chamber and preventing the flow of fluid from said second chamber to said first chamber, said check valve means comprising a flat disk and a second disk transversely superimposed over said first disk whereby said disks can fit and be assembled within said unitary casing;
    a slidable valve stem coupled to said check valve member and extending through said first chamber, said valve stem moving said check valve from an open to closed position;
    means coupled to said valve stem for biasing said slidable valve stem and check valve member toward the closed position; and
    reciprocating valve means operatively coupled to said valve stem for opening and closing said recirculation port; said recirculation valve means being open when said check valve member is closed and closed when said check valve member is open.

9. The low pressure recirculation valve of claim 8 wherein said valve stem is substantially hollow and includes a plurality of aperatures which permit fluid to flow from said first chamber through said recirculation port.

10. The low pressure recirculation valve of claim 9 wherein said recirculation valve means comprises a plurality of slots which align with said apertures so as to create a passageway for fluid when said check valve member is closed.

11. The low pressure recirculated valve of claim 8 wherein said first and second disks each having opposing parallel sides and opposing arcuate sides.

* * * * *

UNITED STATES PATENT AND TRADEMARK OFFICE
CERTIFICATE OF CORRECTION

PATENT NO. : 4,941,502

DATED : July 17, 1990

INVENTOR(S) : Loos et al.

It is certified that error appears in the above-identified patent and that said Letters Patent is hereby corrected as shown below:

column 5, line 44 delete the word "that" at the end of the line column 6, line 50 should read "recirculation" not reciprocating column 6, line 65 should read "recirculation" not recirculated Signed and Sealed this Twenty-fifth Day of June, 1991

Attest:

HARRY F. MANBECK, JR.

*Attesting Officer*

*Commissioner of Patents and Trademarks*